United States Patent
Shortell et al.

(10) Patent No.: US 8,316,318 B2
(45) Date of Patent: Nov. 20, 2012

(54) NAMED CALCULATIONS AND CONFIGURED COLUMNS

(75) Inventors: Kerri Shortell, Littleton, CO (US); Thomas Hora, Parker, CO (US); Kevin Barker, Golden, CO (US)

(73) Assignee: Oracle International Corporation, Redwood Shores, CA (US)

( * ) Notice: Subject to any disclaimer, the term of this patent is extended or adjusted under 35 U.S.C. 154(b) by 1113 days.

(21) Appl. No.: 11/750,454

(22) Filed: May 18, 2007

(65) Prior Publication Data

US 2008/0244430 A1    Oct. 2, 2008

Related U.S. Application Data

(60) Provisional application No. 60/909,289, filed on Mar. 30, 2007.

(51) Int. Cl.
G06F 3/048    (2006.01)
(52) U.S. Cl. .......................... 715/804; 715/212; 715/227
(58) Field of Classification Search .................. 715/804, 715/212, 227, 243
See application file for complete search history.

(56) References Cited

U.S. PATENT DOCUMENTS

| | | | | |
|---|---|---|---|---|
| 5,966,716 A * | 10/1999 | Comer et al. | | 1/1 |
| 6,018,735 A * | 1/2000 | Hunter | | 1/1 |
| 6,138,150 A * | 10/2000 | Nichols et al. | | 709/219 |
| 6,247,020 B1 * | 6/2001 | Minard | | 1/1 |
| 6,301,579 B1 * | 10/2001 | Becker | | 1/1 |
| 6,621,505 B1 * | 9/2003 | Beauchamp et al. | | 715/764 |
| 6,626,959 B1 * | 9/2003 | Moise et al. | | 715/210 |
| 6,801,910 B1 * | 10/2004 | Bedell et al. | | 1/1 |
| 7,185,279 B2 * | 2/2007 | Machalek | | 715/209 |
| 7,581,168 B2 * | 8/2009 | Boon | | 715/215 |
| 7,647,551 B2 * | 1/2010 | Vigesaa et al. | | 715/217 |
| 7,739,593 B2 * | 6/2010 | Uchida | | 715/255 |
| 2002/0077954 A1 * | 6/2002 | Slaight et al. | | 705/37 |
| 2006/0080596 A1 * | 4/2006 | Bhogal et al. | | 715/503 |
| 2006/0184915 A1 * | 8/2006 | DeGroote et al. | | 717/106 |
| 2006/0282818 A1 * | 12/2006 | DeSpain | | 717/109 |
| 2008/0016099 A1 * | 1/2008 | Ikeda | | 707/102 |

\* cited by examiner

*Primary Examiner* — Phenuel Salomon

(74) *Attorney, Agent, or Firm* — Kilpatrick Townsend & Stockton LLP

(57) ABSTRACT

Tools that can be used to enhance visibility into various business processes, using named calculations and/or configured columns to produce customized display grids for displaying data from a database are presented. Such tools may provide the ability to develop, within a business application (and/or in conjunction with a business application) visibility solutions that are customized to that end user's business, without the need for expensive redevelopment and/or extensive customization of the business application itself.

11 Claims, 9 Drawing Sheets

Edit Named Calculations

| General |
|---|

Lot Entity: Lot Composition — 205
Calculation Name: LARGEVARIETY — 210
Creator ID: 000001 — 215
Column Title: Largest Variety — 220

Rule Type: Selected Numeric — 235  🔍 — 260a
Entity Field to Find: Percentage — 240  🔍 — 260b
Rule: Largest — 245  🔍 — 260c
Entity Field to Select: Variety — 250  🔍 — 260d
Entity Field to Return: Variety — 255  🔍 — 260e Submit — 270

NAMED CALCULATIONS AND CONFIGURED COLUMNS

CROSS REFERENCE TO RELATED APPLICATIONS

This application claims the benefit, under 35 U.S.C. §119 (e), of provisional U.S. Patent Application No. 60/909,289, filed Mar. 30, 2007 by Shortell et al. and entitled "Named Calculations and Configured Columns," the entire disclosure of which is incorporated herein by reference for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The present invention relates in general software applications, and more particularly automating the display of information in a business application.

BACKGROUND OF THE INVENTION

Most large businesses (and many smaller businesses and organizations) employ one or more business applications, and in some cases, suites of business applications, to provide visibility and control over various aspects of the business. Such "business applications" (or, as they are sometimes called, "enterprise applications") can include, without limitation, customer relations management ("CRM") applications, enterprise resource planning ("ERP") applications, supply chain management applications, and other applications dealing with various finance, accounting, manufacturing, and/or distribution functions, to name but a few examples. Exemplary enterprise application suites include, without limitation, the Oracle eBusiness Suite™ and JD Edwards Enterprise One™, both of which are available from Oracle Corp.

In many cases, a business application works in conjunction with one or more databases, which store information created and/or used by the business application. In order to provide visibility into business processes, a business application (and/or a separate application working alongside the business application) can be used to query the database with queries designed to provide information about that business process. This information can be used to ensure that business processes are optimized, identify opportunities for increased efficiency, enhance customer relationships, ensure that specific resources and/or supply chains are not introducing inefficiency, verify the quality of outputs, and/or the like.

Merely by way of example, many organizations employ ERP software to provide visibility into manufacturing processes. In many cases, this visibility is provided through the use of preconfigured display grids, which can provide details about various manufacturing processes, the results of those processes, the inputs to those processes, and/or the like. A display grid can be used, for example, to allow a plant manager to view real-time (and/or near real-time) information about products being produced by manufacturing processes at the plant. Such information can include, without limitation, information about the raw materials and/or components used to create the products, information about the operation of machines used in the manufacturing process, information about quality assurance testing of the manufactured products, and/or the like.

Because each business operates differently, however, "one-size-fits-all" solutions are difficult to provide. This situation arises, at least in part, out of the difficulty in foreseeing the specific needs of different businesses when developing business applications. Accordingly, many businesses are forced either to expend significant resources to customize a business application or to forgo customization and use an off-the-shelf business application in a suboptimal manner.

BRIEF SUMMARY OF THE INVENTION

Embodiments of the invention, therefore, provide tools that can be used to enhance visibility into various business processes. In an aspect of some embodiments, such tools can provide, to a large degree, the ability for an end user (e.g., a business owner, plant manager, etc.), and/or IT professionals employed by the end user, to develop, within a business application (and/or in conjunction with a business application) visibility solutions that are customized to that end user's business, without the need for expensive redevelopment and/or extensive customization of the business application itself.

In an aspect, for example, certain embodiments of the invention provide the ability to generate configured columns in a display grid. In an aspect, a configured column can display the results of a specific calculation (referred to herein as a "named calculation"). Beneficially, in an aspect of some embodiments, a named calculation provides a great degree of flexibility in determining the information that will be shown in the corresponding configured column. Again by way of example, a named calculation can be used to derive a value to be placed in a column from information in one or more tables of a database associated with the business application. Beneficially, this flexibility allows users of business applications to define display grids that provide visibility into information of specific interest to that user.

In another aspect of some embodiments, these visibility tools provide the ability to define a format for a display grid. Such a format can specify, for example, the columns (one or more of which can be configured columns) in a display grid, as well as, in some cases, the ordering of those columns. Additional embodiments the invention can provide, in an aspect, the ability to define a path comprising multiple formats. Using such a path, a user can quickly obtain visibility into a wide variety of business processes, all within a single, integrated interface.

The tools provided by various embodiments invention include, without limitation, methods, systems, and/or software products. Merely by way of example, a method might comprise one or more procedures, any or all of which are executed by a computer system. Correspondingly, an embodiment might comprise a computer system configured with instructions to perform one or more procedures in accordance with methods of the invention. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like). In a particular embodiment, the set of instructions might be incorporated within a business application.

Merely by way of example, a method in accordance with one set of embodiments may be performed within the context of a business application. In an aspect, the method comprises accessing a database comprising information about a plurality of product lots. The information may be organized in a set of lot entities, each of which comprises a plurality of data fields. The method may further comprise generating a plurality of named calculations. Each of the named calculations defines, in an aspect of some embodiments, a dynamic column for use in a display grid.

In one embodiment, the method further comprises receiving input regarding a plurality of display grid formats. Merely by way of example, the method might comprise receiving first input regarding a first display grid format and/or defining the first display grid format, based at least in part on the first input. The first display grid format might comprise a first ordering of a first set of columns. The first set of columns, in an aspect, might comprise a first configured column defined by a first named calculation from the plurality of named calculations. Likewise, the method might comprise receiving second input regarding a second display grid format and/or defining the second display grid format, based at least in part on the second input. The second format might comprise a second ordering of the second set of columns, which might comprise a second configured column defined by a second named calculation from among the plurality of named calculations.

The method may further comprise receiving input regarding a display grid format, and/or defining the display grid format path, perhaps based at least in part on the input. In an aspect, the format path comprises a list of a plurality of display grid formats (which might include, for example, the first display grid format and/or the second display grid format) and/or defines an order in which the plurality of display grid formats are to be listed. The display grid format path may be displayed for user, and/or the method may comprise receiving (e.g., from the user) a selection of one of the plurality of display grid formats. A display grid then may be displayed for the user, according to the selected format.

A method of displaying data for a user, in accordance with another set of embodiments, comprises receiving first input from a user and generating a named calculation based on the first input from the user. The named calculation, in an aspect, may be configured to access a database and evaluate one or more sets of data in the database to produce a set of displayable results. In an aspect, the set of displayable results comprises a first displayable result of an evaluation of a first set of data by the named calculation and a second displayable result of an evaluation of a second set of data by the named calculation.

The method may further comprise receiving second input from the user and/or defining a display grid format, based at least in part on the second input received from the user. In some embodiments, the method comprises generating a display grid having the defined display grid format. The display grid might comprise a set of rows and a set of one or more columns. The set of rows, in an aspect comprises a first row representing the first set of data and a second row representing the second set of data. The set of one or more columns might comprise a configured column defined by the named calculation. The configured column, in an aspect, is configured to display, in the first row, the first displayable result and/or to display, in the second row, the second displayable result. The method may include displaying the display grid for the user.

An exemplary system in accordance with another set of embodiments comprises one or more processors and a database. The database might comprise information about a plurality of product lots. This information may be organized in one or more sets of lot entities, each set of lot entities comprising information about a particular product lot. Each of the lot entities might comprise a plurality of data fields. The system, an aspect, further comprises a computer readable medium having stored thereon a set of instructions executable by the one or more processors. This set of instructions may be (but need not necessarily be) incorporated within a business application.

In one embodiment, the instructions comprise instructions for generating a plurality of named calculations, each of which defines a configured column for use in a display grid. The display grid generally comprises one or more rows, each of which might correspond to a different product lot.

In some cases, the instructions further comprise instructions for receiving, e.g., from a user, input defining a specified condition to which a result of a first named calculation should be compared; the first named calculation might define a first configured column. There may be instructions for comparing, for each of the values displayed in the first configured column, a result of the named calculation with the specified condition. The set of instructions might also comprise instructions for returning, with respect to at least one of the rows in the display grid, an indication of whether the result of the named calculation meets the specified condition.

In a set that embodiments, a computer program might be embodied on a computer readable medium and/or might comprise a set of instructions executable by one or more processors. In an exemplary embodiment, the set of instructions comprises instructions for accessing a database comprising information about a plurality of product lots. The information may be organized in a plurality of sets of lot entities, each set of lot entities comprising data about a particular product lot. Each lot entity might comprise a plurality of data fields. The computer program might include further instructions for generating a plurality of named calculations, each of which might define a dynamic column for use in the display grid.

In an aspect of some embodiments, there are instructions for displaying a set of results of the first named calculation in a first column in the display grid. Merely by way of example, the display grid might comprise a plurality of rows, each of which might correspond to one of the product lots, such that a value in the first column for a particular row comprises a result of the named calculation for a product lot corresponding to that particular row. The computer program might further comprise instructions for receiving, e.g., from a user, a selection of a first row and/or for identifying a first result of the named calculation for the first row as a selection criteria. In some cases the computer program comprises further instructions for searching the database for set of data matching the selection criteria and/or for returning the set of data matching the selection criteria.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

FIG. 2 is an exemplary screen display illustrating a user interface for defining a named calculation, in accordance with various embodiments of the invention.

DETAILED DESCRIPTION OF THE INVENTION

Figure 1:
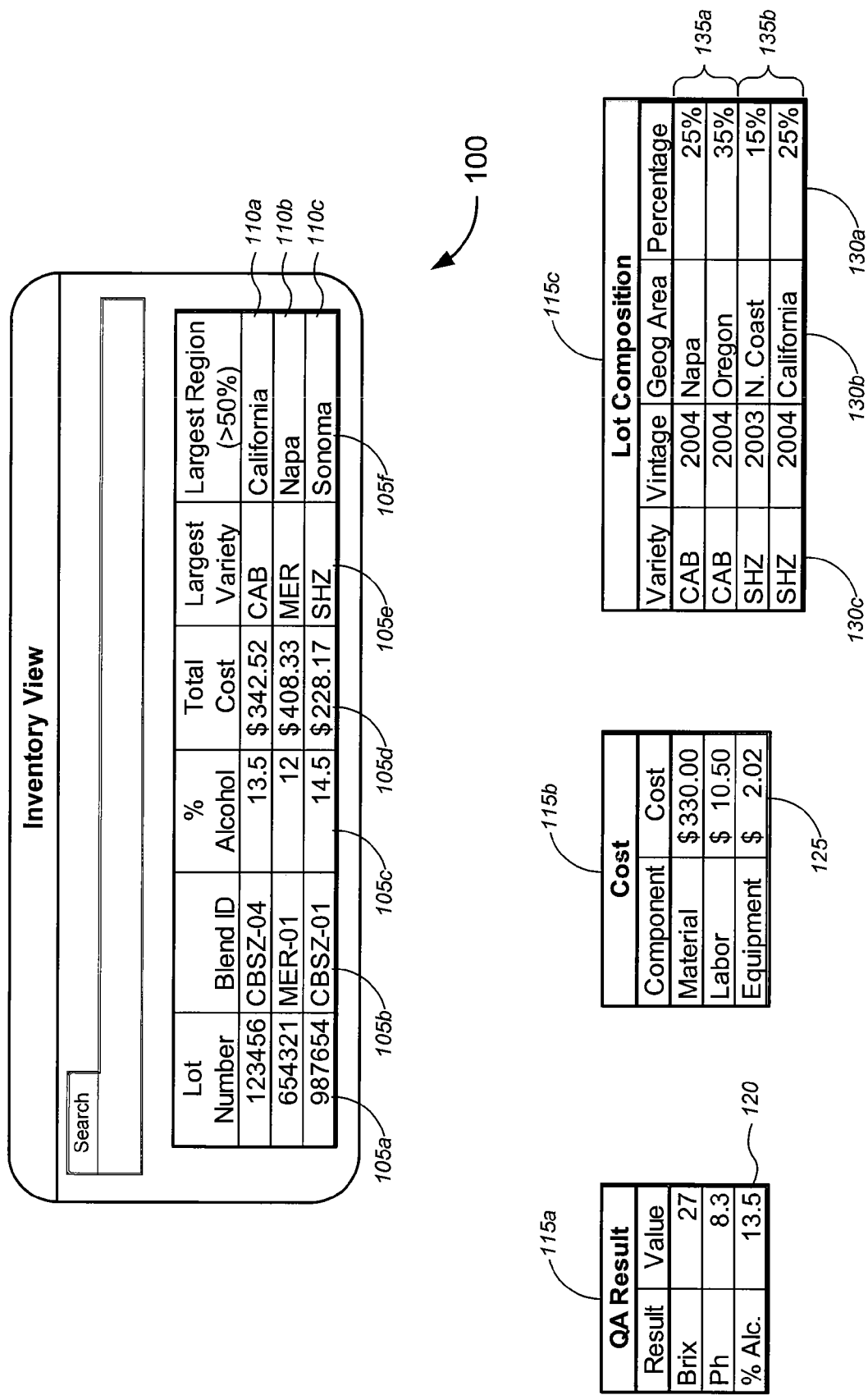
FIG. 1 is an exemplary screen display illustrating a display grid comprising a plurality of configured columns, in accordance with various embodiments of the invention.

While various aspects of embodiments of the invention have been summarized above, the following detailed description illustrates exemplary embodiments in further detail to enable one of skill in the art to practice the invention. In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. Several embodiments of the invention are described below, and while various features are ascribed to different embodiments, it should be appreciated that the features described with respect to one embodiment may be incorporated with another embodiments as well. By the same token, however, no single feature or features of any described embodiment should be considered essential to the invention, as other embodiments of the invention may lack such features.

This document describes, in general, tools that can be used, for example, within a business application (and/or in conjunction with a business application) to enhance visibility into various business processes, although embodiments of the invention are not limited to use with a business application. In an aspect of some embodiments, such tools can provide, to a large degree, the ability for an end user (e.g., a business owner, plant manager, etc.), and/or IT professionals employed by the end user, to develop, within a business application (and/or in conjunction with a business application) visibility solutions that are customized to that end user's business, without the need for expensive redevelopment and/or extensive customization of the business application itself.

Merely by way of example, certain embodiments of the invention provide the ability to generate configured columns in a display grid. In an aspect, a configured column can display the results of a named calculation. Beneficially, in an aspect of some embodiments, a named calculation provides a great degree of flexibility in determining the information that will be shown in the corresponding configured column. Again by way of example, a named calculation can be used to derive a value to be placed in a column from information in one or more tables of a database associated with the business application. Beneficially, this flexibility allows users of business applications to define display grids that provide visibility into information of specific interest to that user.

In another aspect, some embodiments provide the ability to define a format for a display grid. Such a format can specify, for example, the columns (one or more of which can be configured columns) in a display grid, as well as, in some cases, the ordering of those columns. Additional embodiments the invention can provide, in an aspect, the ability to define a path comprising multiple formats. Using such a path, a user can quickly obtain visibility into a wide variety of business processes, all within a single, integrated interface.

Named calculations and/or configured columns can be used in a wide variety of applications, in accordance with different embodiments of the invention. Merely by way of example, a configured column can be used to identify whether a result of a business process (e.g., an end product) meets a specified condition. This functionality can be used, for example, for quality assurance purposes. As another example, a configured column can be used to provide, for the user, selection criteria. In this way, for instance, a configured column could be used to allow the user to select various product lots for further inspection, based on characteristics identified by a named calculation. (It should be noted, however, that these enumerated applications are merely exemplary nature, and that the configured columns and/or named calculations of various embodiments of the invention can be used in a wide variety of applications.)

In one aspect, embodiments of the invention use named calculations to create configured columns that can be used in a display grid to display information for user. As used herein, the term "display grid" means any type of user interface device in a software program that is used to display for user a set of data organized into sets of rows and columns (i.e., a grid). One set of embodiments can be used to create and/or display information about data stored in a database. One example of such data about a set of product lots, which are used with respect to FIGS. 1 and 2 to illustrate various features of one set of embodiments. (It should be appreciated, however, that information about various other types data—including without limitation data about accounts, customers, employees and/or other resources, and in fact anything about which data and/or metrics can be generated, stored, analyzed and/or displayed—may be displayed in accordance with embodiments of the invention.) The term "product lot" is used herein to describe a related set of products that comprise the output of one or more business and/or manufacturing processes. These products might be related, for example, as having common inputs, as being the result of a particular manufacturing run, and/or the like.

For illustrative purposes, and not as limiting the invention in any respect, the exemplary embodiment discussed with respect to FIGS. 1 and 2 pertains to product lots involved with the production of wine. Such product lots can include grape lots, wine lots, and/or the like. (In fact, in an aspect, a grape lot can be transformed to a wine lot during the winemaking process; this illustrates the principle that a product lot can change characteristics, and/or can become a new product lot, during the course of a business process.)

FIG. 1 illustrates a screen display showing a display grid 100 that comprises a plurality of columns 105 and a plurality of rows 110 (while columns are generally organized vertically and rows are generally organized horizontally in the illustrated embodiments, it should be appreciated that the special orientation of rows and columns for display is discretionary. In fact, while rows and columns are generally displayed orthogonally in the described embodiments, this is not required by the invention.) In an aspect, each row 110 corresponds to and/or represents a particular data set (which might be a table or set of tables, a record or set of records, etc.) stored in a database. As noted above, in this particular example, each row 110 corresponds to a product lot in a winemaking process. Each column 105 displays various data and/or characteristics of the product lots. Each intersection of a row 110 and column 105 is described herein as a "cell" in the display grid 100. In a general sense, a particular cell displays a value of the characteristic and/or data defined by the column 105 that the cell resides in, for the product lot corresponding to the row 110 that the cell resides in. Hence, for example, the display grid 100 indicates that lot number 123456 (corresponding to row 110a) has an alcohol percentage (defined by column 105c) of 13.5%.

One or more of the columns 105 in a display grid 100 may be configured columns, in accordance with embodiment of the invention. In other words, one or more of the columns 105 may be defined by a named calculation. In fact, in the illustrated embodiment, the "percent alcohol" column 105c, the "total cost" column 105d, the "largest variety" column 105e, and the "largest region" column 105f all our configured columns. (It should be noted, however, that a display grid 100 need not comprise configured columns exclusively. Merely by way of example, the "lot number" column 105a need not be a configured column.)

As noted above, a configured column generally is defined by a named calculation. Merely by way of example, in an aspect, a named calculation is used to specify and/or derive values to be displayed in a configured column. There can be wide variety in the types of named calculations that are be used to define configured columns in accordance with embodiment of the invention. In one aspect, a named calculation can operate on data from one or more tables in a database (or, for that matter, any number of databases) to produce results for display in the configured column. Merely by way of example, the configured columns 105d-f collectively display (with respect to row 110a) values generated from data in three different tables 115 from a database associated with a business application in which the display grid 100 is displayed. These tables 115 include a Quality Assurance ("QA") Result table 115a, a Product Cost table 115b, and a Lot Composition table 115c. The interaction between these tables 115 and the display grid 100 is described in further detail below.

It should be noted that the tables 115 all comprise data that correspond to lot number 123456, which corresponds to row 110a in the display grid. It should also be appreciated that, although they are not illustrated on FIG. 1, there may be corresponding tables comprising data associated with the product lots represented by rows 110b-c. Each of these tables can be considered a lot entity associated with the product lot for which they comprise data. Hence, while the named calculations in this exemplary embodiment are described with respect to their operation on lot number 123456, which corresponds to row 110a, one skilled in the art will appreciate that a named calculation for a particular column will generate values for each cell in that column, based, in many cases on data stored in tables for the respective product lots corresponding to each row. Some tables may be specific to a particular product lot, while other tables might pertain to some or all of the product lots collectively. Merely by way of example, in the illustrated embodiment, tables 115a and 115b are specific to product lot 123456, corresponding to row 110a, while the "Lot Composition" Table 115c comprises data for all of the product lots. (It should also be appreciated, however, that the organization of data into various tables in the database is discretionary and does not affect the scope of the invention.)

FIG. 1 illustrates, for exemplary purposes, several configured columns 105c-f that are defined by a few such types of named calculations, but these examples should not be considered limiting. As a simple example, a first named calculation might specify that the "%Alcohol" column 105c showed merely display values obtained from a set of quality assurance results tables corresponding to the product lots in the display grid. Thus, for instance the value in that column 105c for lot number 123456 in row 110a is generated by obtaining the data from the appropriate cell 120 in the QA Results table 115a for that product lot. In generating the display grid 100 for display to the user, the tool thus performs a lookup on the table 115a to obtain the appropriate value for display in the relevant cell of the display grid 100.

As a slightly more involved example, consider the "Total Cost" column 105d. The named calculation defining this column specifies that the displayed value should be calculated by summing multiple cost values stored in a column of a product cost table for each product lot. Hence, the value for the cell at the intersection of the total cost column 105 and the row 110a for product lot number 123456 is calculated by summing the values in a column 125 of the Product Cost table 115b for that product lot.

The "Largest Variety" column 105e and "Largest Region (<50%)" column 105f provide examples of configured columns defined by relatively more complex named calculations. For instance, the "Largest Variety" column 105e is defined by named calculation that specifies that the values for that column 105e are to be derived from lot composition tables for the relevant product lots. Specifically, the named calculation defining "Largest Variety" column 105e specifies that the values for the cells in this column 105e are to be derived by identifying the most common variety (by percentage of product lot) in the relevant lot composition table.

For instance, the particular Lot Composition table 115c illustrated on FIG. 1 corresponds to product lot number 123456, which corresponds to row 110a. Each row in the Lot Composition table 115c corresponds to one set of grapes from which product lot 123456 is comprised. (In other words, the four rows of the Lot Composition table 115c collectively comprise the blend of grapes of which product lot 123456 is made. The percentage of each type of grape in the blend is identified by column 130c.)

The named calculation defining column 105e specifies that the value of the cell at the intersection of column 105e and row 110a is derived by analyzing the Lot Composition table 115c. Specifically, this named calculation specifies that the percentage values in column 130a should be subtotaled for each unique value in column 130c (i.e., that the values in column 130a for rows 135a, which correspond to the CAB variety, should be summed and that the values in column 130a for rows 135b should be summed separately), and those values compared. The named calculation further specifies that the value in column 130c corresponding to the largest subtotal should be returned and displayed in the appropriate cell (at the intersection of row 110a and column 105e in the display grid 100).

The "Largest Region (>50%)" column 105f is an example of a configured column defined by an even more complex named calculation. Like the named calculation described above with respect to the "Largest Variety" column 105e, the named calculation defining the "Largest Region" column 105f is configured to analyze the values in the Percentage column 130a of the lot composition table 115c. In this case, however, the named calculation returns a value from the Geographical Area column 130b. An additional difference is that the named calculation specifies that the returned value should represent a geographical area corresponding to greater than 50% of the blend for the selected product lot. Hence, while Oregon is the geographical area corresponding to the largest single portion of the blend, it only accounts for 35% of the blend. In this example, however, the values in the geographical area column 130b are hierarchical, and the named calculation specifies that these hierarchical values should be "rolled up" until a geographical area corresponding to greater than 50% of the blend can be determined. In this case, for example, the Napa geographical area is rolled up into the California geographical area, producing a collective blend proportion of 50% for California. Hence, "California" is returned as the value for the cell at the intersection of column 105f and row 110a.

FIG. 2 illustrates a user interface 200 for a display tool (which may be, but need not be, incorporated within a business application. The user interface 200 that can be used to define a named calculation for a particular column. For illustrative purposes, the user interface 200 is shown depicting values that correspond to the named calculation for the "Largest Variety" column 105e in FIG. 1, although one skilled in the art, based on the disclosure herein, can easily ascertain how this user interface 200 could be used to define any number of named calculations, including without limitation, named calculations for defining other configured columns (e.g., 105c, 105d and 105f) of the display grid 100 of FIG. 1.

The user interface 200 comprises a plurality of data input fields, which can be used by a user to submit (and by the display tool to receive) input data for defining a named calculation. For example, a lot entity data input field 205 can be used to identify a lot entity to which the named calculation pertains. As used herein, the term "lot entity" means any identification of a data source (e.g., a set of data about a particular lot, a particular table in the database, and/or the like). Another data entry field 210 can be used to provide a calculation name for the named calculation. This calculation name can be used to identify the named calculation (e.g., for purposes of reusing the named calculation in other columns, display grants, and/or the like) within the business application and/or display tool. In some embodiments, a data input field 215 may be provided to allow input of an identification of the creator of the named calculation (optionally, this field may be populated with a default value by the business application based, for example, on user credentials provided by the user when accessing the business application, etc.). The user interface 200 may also include a data input field 220 to allow the user to provide a column title for the column to be defined by the named calculation. This column title may be used, for example, as the column label in a display grid. (This feature can be ascertained from the illustrated embodiment by comparing the value in the column title data input field 220 with the label at the top of column 105e in FIG. 1). (The column title can also be used, for example, to identify the column defined by the named calculation when defining a display grid format, as described in detail below)

In an aspect, the user interface 200 further comprises a set of data input fields 235-255 to allow the user to specify the operations to be performed by the named calculation in generating values to be displayed in the column defined by the named calculation. In some embodiments, the number and/or nature of the data input fields in this set will depend on the lot entity selected.

A first such field 235 can be used to identify a rule type to be applied by the named calculation. Based on the disclosure herein, one skilled in the art can appreciate than a wide variety of different rule types can be used to define a named calculation in accordance with embodiments of the invention. Exemplary rule types can include, without limitation, the following: a "select single" rule type, which can be used to find a specific field in a table, and return the value of that field (the named calculation defining the "% Alcohol" column 105a in FIG. 1 is an example of a single select rule); a "selected numeric" rule type, which can be used to search a selected numeric field using a specified rule and return a string value for display in the configured column (the named calculation defining the "Largest Variety" column 105e in FIG. 1 is an example of a selected numeric rule type); a "selected string" rule type, which can be used to find a specific field in the table that contains a specific string value and return a numeric value (within the context of the winemaking example, such a named calculation might search for a particular variety in a product lot and return the percentage of the blend that that variety contributes); a "value" rule type, which can provide a numerical value, such as a total, an average, a count, and/or the like, derived from a set of cells (e.g., such as all of the cells in a particular column, etc.) in a lot entity table (the named calculation for the "Total Cost" column 105d in FIG. 1 is an example of a value rule type); and a custom calculation rule type, which can be used to apply a customized function to a set of data. Based on this disclosure, one skilled in the art can appreciate that a wide variety of rule types are possible within the scope of the invention.

Additional data input fields (such as the fields 240-255 illustrated on FIG. 2) may be displayed. The number and nature of these additional data input fields depend, in a set of embodiments, on the rule type selected. One possible data input field is a field 240 that allows a user to specify the field to find in the lot entity (e.g. table) specified by the named calculation. This field 240 essentially defines the search universe, within a lot entity, for the named calculation. In some cases, the user may be provided with a predefined list of fields, which may be based on the fields, rows, and/or columns defined for that lot entity, as well, in some cases, as the rule type, which might specify (as demonstrated above, for example) the types of fields that can be searched. Additionally and/or alternatively, the user may be allowed to simply type in a field name.

Another possible data input field is a field 245 that allows the user to specify a rule to be applied by the named calculation. In some embodiments, the user is given a list of appropriate rules, based on the rule type and/or the selected field to find. Merely by way of example, if the rule type is "selected numeric," the entity field to find should be a numeric field, and the rule to be applied should be a rule is appropriate for numeric values. Such rules can include comparison operators, threshold values, largest value (among a set of values), second largest value, smallest value, total, etc. As another example, if the rule type is "selected string," available rules might include those that are appropriate for string values, such as various comparison operators. The "value" rule type can include, inter alia, rules such as total, count, and/or the like. For the "select single" rule type, there may not be any rule to apply, because the rule type simply returns the value from a particular field.

Depending on the selected rule, the interface 200 might also provide additional data input fields for a lot entity field to select 250 and/or a lot entity field to return 255. The data input field 250 for the lot entity field to select can be used to specify the field (and/or set of fields, such as a portion of a column or row) that should be selected, based on the evaluation of the lot entity field to find. For some rules and/or rule types (such as selected string and selected numeric rule types, to name two examples), the named calculation returns a different field than that selected by the rule, and the data input field 255 for the lot entity field to return can be used to specify which field should be returned by the named calculation for display in the configured column.

In accordance with some embodiments, one or more of the data input fields 235-255 may be accompanied by a user interface element 260 that can be used to prompt the user with possible input values. Depending on the type of data input field, the user interface element 260 (which may be a button, a hyperlink, and/or the like) can be used to display, for example, a list of available fields, the lot entity (e.g., table) specified as the target for the named calculation (e.g., so that the user can see available fields in context), a list of available rule types and/or rules, and/or the like. Based on the disclosure herein, one skilled in the art will appreciate the wide variety of prompting devices that could be triggered by the use of user interface element 260. The user interface 200 may include an additional user interface element 270 (e.g., a button and or the like) that can be used to submit the data for reception by the display tool and/or business application, triggering the generation of the named calculation, based on the values provided in the data input fields (e.g., 205-255).

As noted above, FIG. 2 illustrates the user interface 200 with the input data fields 205-255 populated with data to generate a named calculation for the "Largest Variety" column 105e of FIG. 1. This example illustrates how the data input fields 205-255 correspond to the operation of the named calculation, with respect to the Lot Composition table 115c. For instance, data input field 205 is populated with the value "Lot Composition," indicating that the Lot Composition table 115c is to be the target of this named calculation. Data input fields 210 and 215 are populated with arbitrary data that can be used to facilitate the later identification of the named calculation. Data input field 220 is populated with the value "Largest Variety," which corresponds to the column title for the "Largest Variety" column 105e on FIG. 1

Continuing with the example, data input field 235 is populated with the value "Selected Numeric," indicating that the selected numeric rule type should be used by the named calculation. Data input field 240 is populated with the value "Percentage," indicating that the percentage column 130a in the Lot Composition table 115c contains the fields that should be evaluated, and data input field 245 is populated with the value "Largest," indicating that the rule to be applied should select the row with the largest value in the percentage column 130a. Data input field 250 is populated with the value "Variety," indicating that the field that should be selected from selected row is in the variety column 130c. In this example, the field to return as the same as the field to select, so data input field 255 contains the same value as data input field 250. The operation of this named calculation is described above in detail.

Based on this example, one skilled in the art can ascertain how named calculations for other configured columns (including, without limitation, the other configured columns 105c, 105d, and 105f on the display grid 100 of FIG. 1) could be defined and generated.

Figure 3:
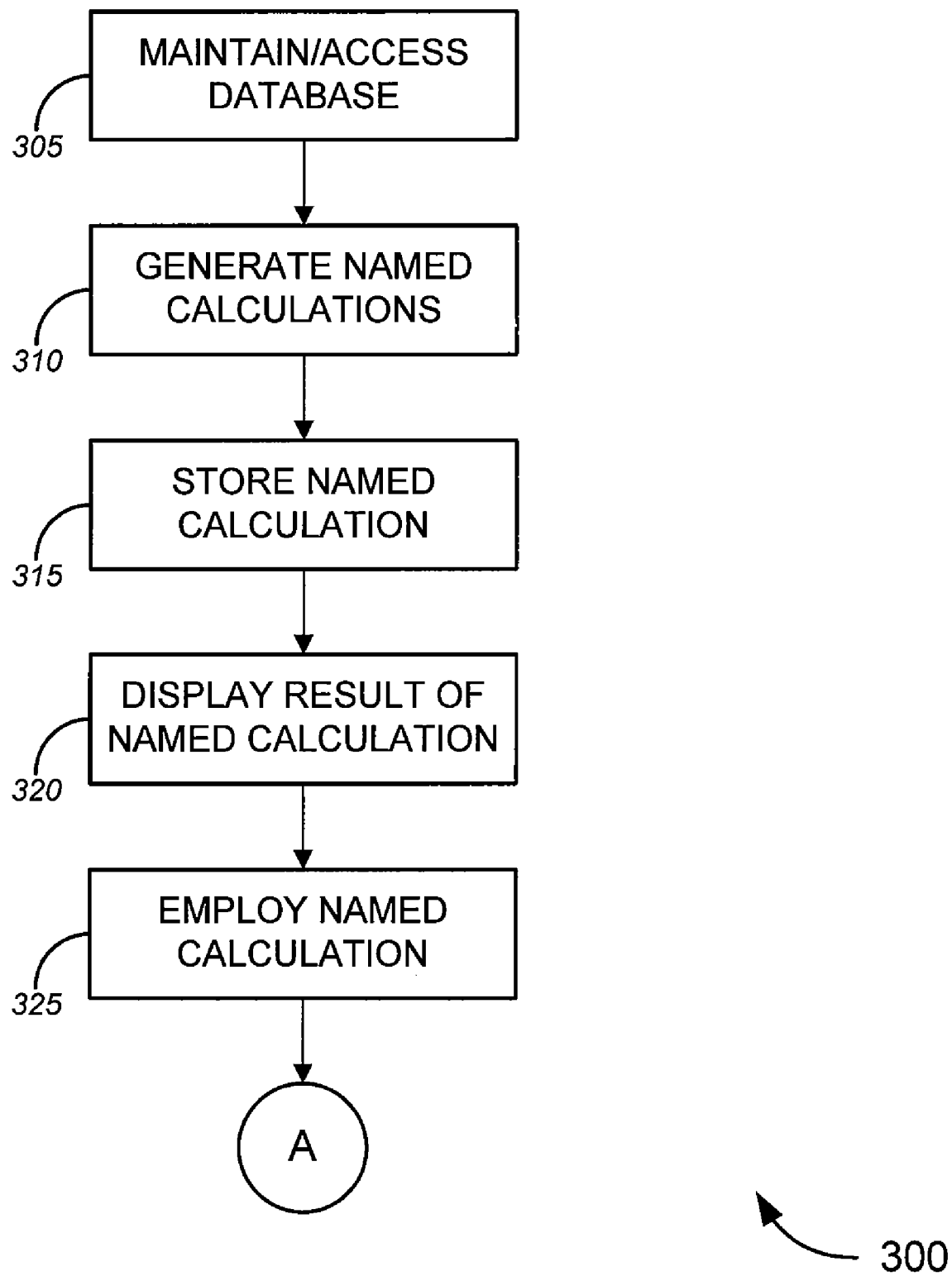
FIG. 3 is a process flow diagram illustrating a method of displaying data using configured columns, in accordance with various embodiments of the invention.

FIG. 3 illustrates a method 300 of displaying data using named calculations, in accordance with some embodiments. The method 300 comprises maintaining and/or accessing a database (block 305). Maintaining a database can comprise any one or more of several actions with respect to the database. Merely by way of example, simply providing a database and/or providing access to the database can be considered maintaining a database. Additionally, storing and/or updating information in the database can be considered maintaining a database. Based on this disclosure, one skilled in the art will understand that a variety of other actions can also be considered to be maintaining a database.

Likewise, accessing a database can comprise any of a variety of actions as well. Merely by way of example, performing a search in a database (using, for example a Structured Query Language "SQL" query, any of a variety of commercially-available database access tools and/or the like), updating data in a database and/or the like can be considered access and database. In some embodiments, accessing the database comprises obtaining, from the database, information used to generate a named calculation, evaluate a named calculation, populate a configured column, and/or create a display grid.

As noted above, the database often will comprise information about many product lots, and that information may be organized into a plurality of sets of lot entities. Merely by way of example, the database might contain a set of tables (including, without limitation, tables such as the tables 115 illustrated by FIG. 1) for each product lot. In another embodiment, a single table might comprise information about a plurality of product lots. Also as illustrated by the tables 115 of FIG. 1, each of the tables may comprise a plurality of data fields (which may be, but need not be, organized in rows and columns).

(It should be noted once again that embodiments of the invention are not limited to named calculations and/or configured columns that deal with product lots, and that the descriptions of product lots provided herein are intended merely to be illustrative. Merely by way of example, rather than product lots, an embodiment of the invention might comprise named calculations for displaying (and/or analyzing) employee data, customer data, financial data, and/or any of a variety of other types of data, including without limitation data commonly used and/or produced by a business application.)

Figure 4:
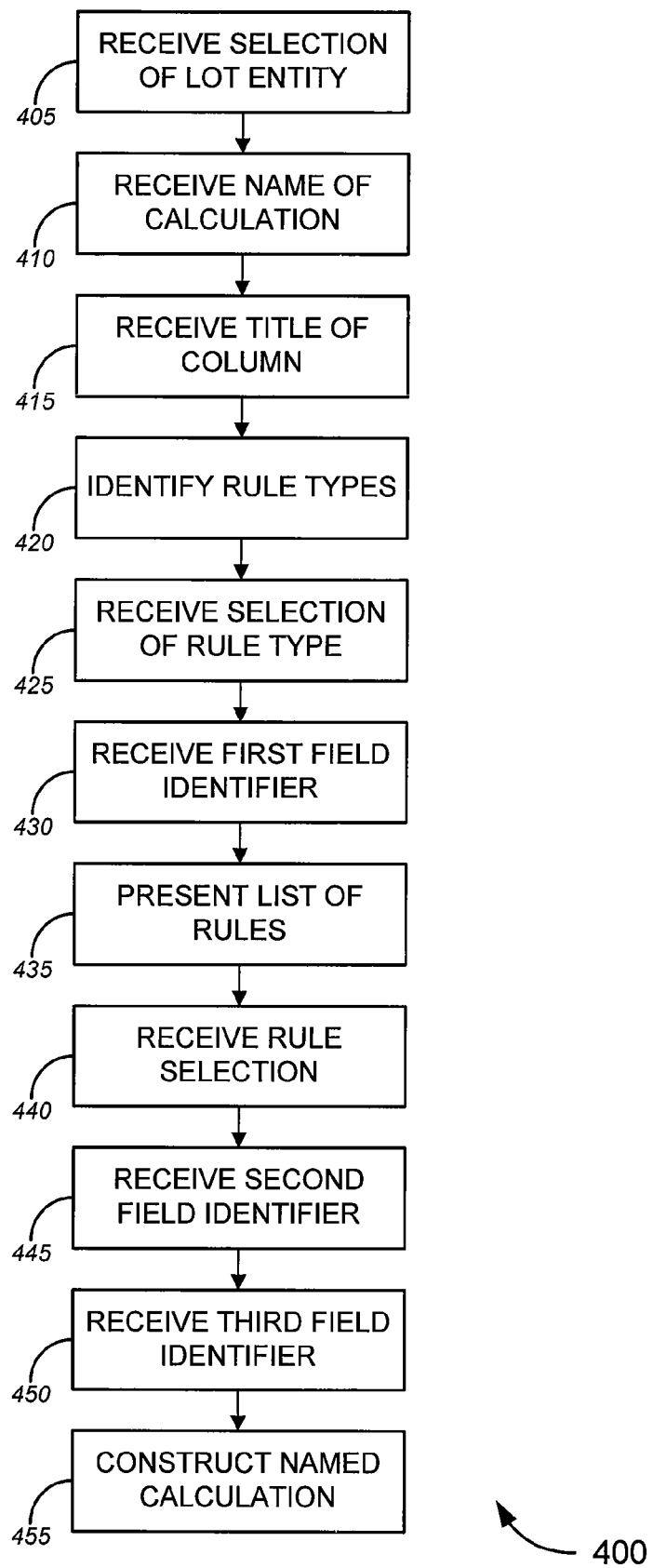
FIG. 4 is a process flow diagram illustrating a method of generating a named calculation and/or a configured column, in accordance with various embodiments of the invention.

The method 300 further comprises generating one or more named calculations (block 310). There are a variety of possible procedures for generating a named calculation, and any of such procedures may be used in accordance with various embodiments of the invention. Merely by way of example, FIG. 4 illustrates a method 400 of generating a named calculation, in accordance with some embodiments. In one aspect, some of the procedures in the method 400 of FIG. 4 may be performed with a user interface such the user interface 200 illustrated by FIG. 2. Merely by way of example, the method 400 comprises receiving various data, as described in further detail below. In one set of embodiments, this data can be received by providing a set of data input fields (e.g., in a web page, a dedicated client application and/or the like) and receiving from the user (e.g., via a web browser and/or web server, from a dedicated client, etc.) a set of data provided by the user into the data input fields. Hence, the method 400 is described with respect to the various data input fields of FIG. 2, although other embodiments might use different user interfaces (and/or perhaps no user interface at all).

Referring to FIG. 4, the method 400 comprises receiving a selection of a type of lot entity to which the named calculation applies (block 405). As noted above, in an aspect of some embodiments, the database comprises a set of lot entities (e.g., tables) corresponding to each product lot. In a particular embodiment, each product lot will have associated there with a similar set of lot entities (e.g., in the embodiment illustrated by FIG. 1, each row 110 will have an associated set of tables similar to the tables 115 corresponding to lot 123456 represented by row 110*a*). Hence, by selecting the type of lot entity, the user can specify, for each respective product lot, which lot entity (or lot entities) is relevant to the named calculation. A data input field, such as the field 205 of FIG. 2 can be provided to allow the user to select the type of lot entity. Referring back to the example of FIG. 2, the selected lot entity is the "Lot Composition" table.

The method 400 further comprises receiving a name of the named calculation (block 410). As noted above, a data input field 210 can be provided for this purpose, and the name of the named calculation can be used to refer to the named calculation subsequent to its creation. At block 415, the title of the configured column to be defined by the named calculation is received, perhaps by providing a data input field 220 and/or allowing the user to specify the name.

In a set of embodiments, the method 400 comprises identifying a set of available rule types (block 420). In some cases, the set of available rule types may be based on the selected lot entity. Merely by way of example, if the lot entity is a one-dimensional table (such as the tables 115*a* and 115*b* of FIG. 1), relatively more complex rule types (such as the selected numeric and selected string rule types) might not be available, while other rule types (such as the select single and value rule types) might be available. For multi-dimensional tables (such as the table 115*c* of FIG. 1), a wider variety of rule types might be available. In some cases, identifying a set of available rule types might comprise presenting the user with a list of available rule types and allowing the user to select a rule type from the list.

At block 425, the method 400 comprises receiving a selection of a rule type. In an embodiment, a data input field 235 may be provided for this purpose. As noted above, in some cases, a list of available rule types might be provided to the user, and/or the user might be allowed to select from among this list (in which case, for example, the data input field 235 might comprise a pick list, combo-box or similar user interface element). In other cases, the data input field 235 might simply allow the user to type the name of the desired rule type. In the example of FIG. 2, above, the selected rule type is "Selected Numeric," indicating that the named calculation will apply this rule type to the "Lot Composition" table (e.g., 115*c*) for each product lot to be displayed in a display grid employing the named calculation.

In some embodiments, the method 400 further comprises receiving a first field identifier (block 430), e.g., via a data input field 240. This first field identifier (which might be a field name, a field label, a code associated with a particular field, etc.) corresponds to a field or fields (in each lot entity of the selected type) that is to be evaluated by the named calculation. Hence, for the example described above with respect to FIG. 2, the first field identifier is the "Percentage" field, indicating that the named calculation should evaluate this field for each product lot (i.e., each row in the "Lot Composition" table 115*c*) when generating a configured column.

In some embodiments, the user may be presented with a list of rules (block 435). As noted above, the available rules might vary based on the selected rule type and/or the nature of the field to be evaluated. In some cases, the list of rules might be presented, similar to a list of available rule types, by a pick list, combo-box, and/or the like, which might comprise (and/or be incorporated in) a data input field 245. The method 400 then, in an aspect, comprises receiving a selection of a rule to be applied to the field to be evaluated (block 440). A data input field 245 might be provided for this purpose. As noted above, the data input field might provide available rules from which the user can choose and/or might allow the user to type the name of the desired rule. In the example of FIG. 2, the selected rules is "Largest," indicating that the named calculation should select the row in the "Lot Composition" table having the largest value for the "Percentage" field (e.g., the largest value in the "Percentage" column 130*a* of the Lot Composition table (e.g., 115*c*) for each product lot to be displayed by a display table employing the named calculation.

Depending on the selected rule type and/or rule, the method may further comprise receiving a second field identifier (block 445), e.g., via a data input field 250. This second field identifier corresponds to a field to be selected by the named calculation. In the example of FIG. 2, this second field identifier is the "Variety" field, indicating that the value in that column 130*c* (for the row specified by the evaluation of the "Percentage" field by the "Largest" rule) should be selected by the named calculation. Similarly, depending on the selected rule type and/or rule, the method may include receiving a third field identifier (block 450), e.g., with a data input field 255. This third field identifier specifies a field or fields in the selected row of each relevant lot entity to be returned as the value to be displayed in the configured column defined by the named calculation. (In some cases, the selection of this third field identifier may be unnecessary, as the selected field—identified by the second field identifier—might simply be returned as the field to be displayed.)

At block 455, the named calculation is constructed. In a set of embodiments, constructing the named calculation comprises generating an expression reflecting the lot entity, rule type, rule, and/or field identifiers selected as described above. When evaluated, with respect to a particular product lot, this expression will produce a value that can be displayed in the cell of a display table that represents the intersection of the row for that product lot and the configured column defined by the named calculation. Merely by way of example, the named calculation in the example of FIG. 2, when applied to product lot number 123456 (represented by row 110*a* in FIG. 1) will produce a value of "CAB," which is then displayed in the cell at the intersection of row 110*a* and column 105*e* of the display grid 100 of FIG. 1. In a set of embodiments, the named calculation might comprise one or more SQL commands that operate on the database to produce the values for display in a configured column defined by the named calculation.

Returning to FIG. 3, once the named calculations have been generated, they can be stored (block 315), e.g., in the database, as a Java class, in a file, and/or the like. There are, for example, a variety of ways known in the art to store an expression in a database. Merely by way of example, the named calculation might be stored as one or more records and/or stored procedures in the database.

In some embodiments, a result of one or more of the named calculations may be displayed (block 320) In one embodiment, displaying a result of one or more named calculation(s) comprises displaying a display grid, of which the display grid 100 of FIG. 1 is but one example. Using that example, one skilled in the art can ascertain, based on the disclosure herein, that each of the configured columns 105*c-f* displays the results of a named calculations that defines that column. For instance, the "Largest Variety" column 105*e* displays, for each of the product lots corresponding to rows 110*a-c*, the result of the named calculation described with respect to FIG. 2, as applied to that particular product lot. In other embodiments, the named calculation may be employed (in any of a variety of different applications or contexts) in a business application (and/or in conjunction with a business application and/or database) (block 325).

Figure 5:
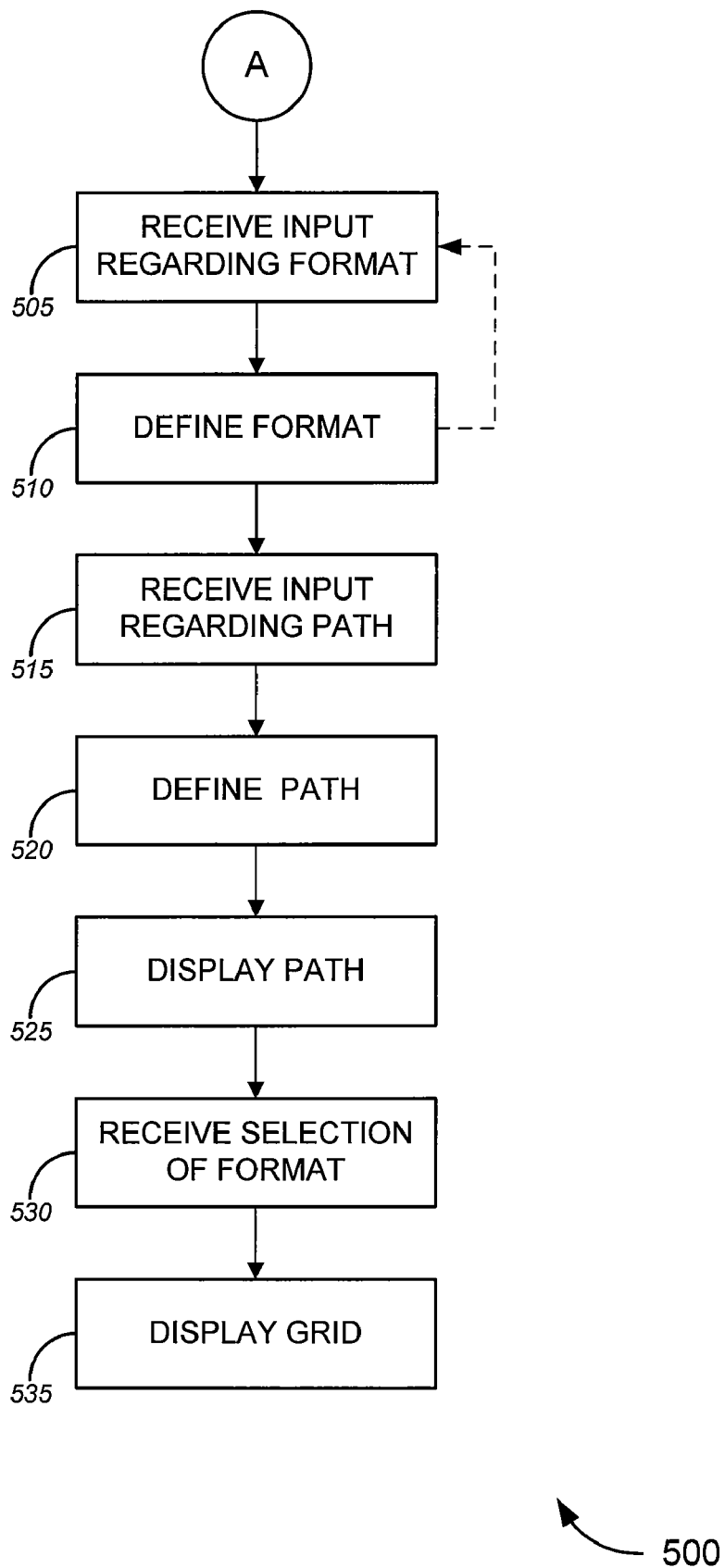
FIG. 5 is a process flow diagram illustrating a method of generating a display path for displaying data in display grids having multiple formats, in accordance with various embodiments of the invention.

FIG. 5 illustrates a method 500 of displaying data in accordance with one set of embodiments. In an aspect, the method 500 can be considered an application of the named calculations and/or configured columns of the invention, and it can employ display grids created in accordance with the method 300 of FIG. 3. In particular, the method 500 can be used to define a plurality of display grid formats, which can be used to display data from the database from a variety of different perspectives, depending on user needs. A display grid format, in an aspect, defines how a display grid will be displayed. Hence, a display grid format might specify what columns (which can include, without limitation, configured columns) and/or rows should be displayed, and the order in which those columns and/or rows should be displayed. Other characteristics of the display grid can be defined by the display grid format as well. Merely by way of example, the format might specify whether the display tool should allow the user to sort the rows of a display grid by the values in one or more columns, this sorting feature can be defined by the display grid format. Similarly, the display grid can define a default sort order, as well as selection characteristics, which specify how rows for display in the grid are selected.

Merely by way of example, in the winemaking example described herein, the display grid format might specify that all product lots in the database should be displayed in respective rows, and that the default sort order should order the displayed rows according to the lot number of each product lot. The display grid format might further specify that the columns to be displayed, in order, are columns for "Lot Number," "Blend ID," "% Alcohol," "Total Cost," "Largest Variety," and "Largest Region (<50%)." This display grid format would produce a display grid similar to the display grid 100 of FIG. 1. (In this example, the last four columns are configured columns, although various display grid formats may have any number of columns, of which any or all might be configured columns.)

The method 500 comprises receiving input regarding a desired display grid format (block 505). In one set of embodiments, a user interface may be provided to enable the user to provide such input, in similar fashion as the procedures described with respect to FIG. 2 for providing input to generate a named calculation. It should be appreciated, of course, that the type of input received for defining a display grid format will vary from the type of input received for creating a named calculation. For instance, the interface for defining a display grid format might include data input fields for specifying one or more columns to be displayed (perhaps by selecting from a list of available columns, including without limitation configured columns), for specifying a column order, for specifying row selection criteria, for specifying a default sort order for the rows, for specifying which, if any, columns can be used to sort the displayed rows, and/or the like. As noted above, the process for defining a named calculation can include providing a column title for the configured column defined by the named calculation. In some embodiments, this column title can be used to identify the configured column(s) which specifying the one or more columns to be displayed.

The method 500 further includes defining a display grid format based on the received input (block 510). As noted above, the display grid format will include an ordering of a set of columns, any or all of which might be configured columns. Each configured column generally will be defined by a particular named calculation, as noted above. The procedures of receiving input and defining a display grid can be repeated as necessary for each desired display grid format that the user would like to create. (It should be noted that configured columns, and indeed, any column, can be reused among display grid formats. In other words, two or more display grid formats can, but need not, share one or more columns in common.)

In some cases, the method 500 further comprises receiving input regarding a display grid format path (block 515). A user interface, which may be similar in some respects to the user interfaces described above, can be used to receive such input. In some cases, receiving the input will comprise displaying, for a user, some or all of the defined display grid formats (some of which might be defined by the user as described above, and some of which might be predefined), and receiving one or more selections of display grid formats to be added to a display grid format path. In other cases, the user might also provide input about an order in which the display grids should be listed in the display grid path and/or a default display grid to be displayed. The method, then, might further comprise defining a format path (block 520), based, in some cases, on the received input. In an aspect, the format path might comprise a list of format paths and/or might define an order in which the format paths are to be listed. The defined display grid format path (as well as the defined display grid formats themselves) may be saved, for example in the database, as one or more files, and/or the like. If desired, multiple display grid format paths can be created in this fashion.

In some cases, the display grid format path may be displayed for a user (block 525) and/or a selection of a display grid format may be received (block 530). The method 500 thus may comprise displaying a display grid having the selected display grid format (block 535). The display grid 100 of FIG. 1 is but one example of a such a display grid. Displaying a display grid may comprise, merely by way of example, generating a web page comprising the display grid, transmitting the web page to a user computer, and/or displaying the web page in a web browser. In other embodiments, the display grid may be displayed by a dedicated application (such as a dedicated client for a business application, a standalone display grid viewing program, and/or the like).

Another application of named calculations and/or configured columns, in accordance with a set of embodiments, is the comparison of a set of results of a named calculation with a specified condition. This feature can be used, for example, for quality assurance purposes (e.g., as a pass/fail criterion). Merely by way of example, a named calculation may be used to derive a value for a critical indicator of product lot quality, and the result of the named calculation (e.g., for each of one or more of selected product lots) can be evaluated with respect to a specified condition to ensure that each product lot meets the specified condition. In another example, this feature could be used to ensure that some financial performance indicator (e.g., quarterly revenue for each of several divisions) meets a specified criteria.

Figure 6:
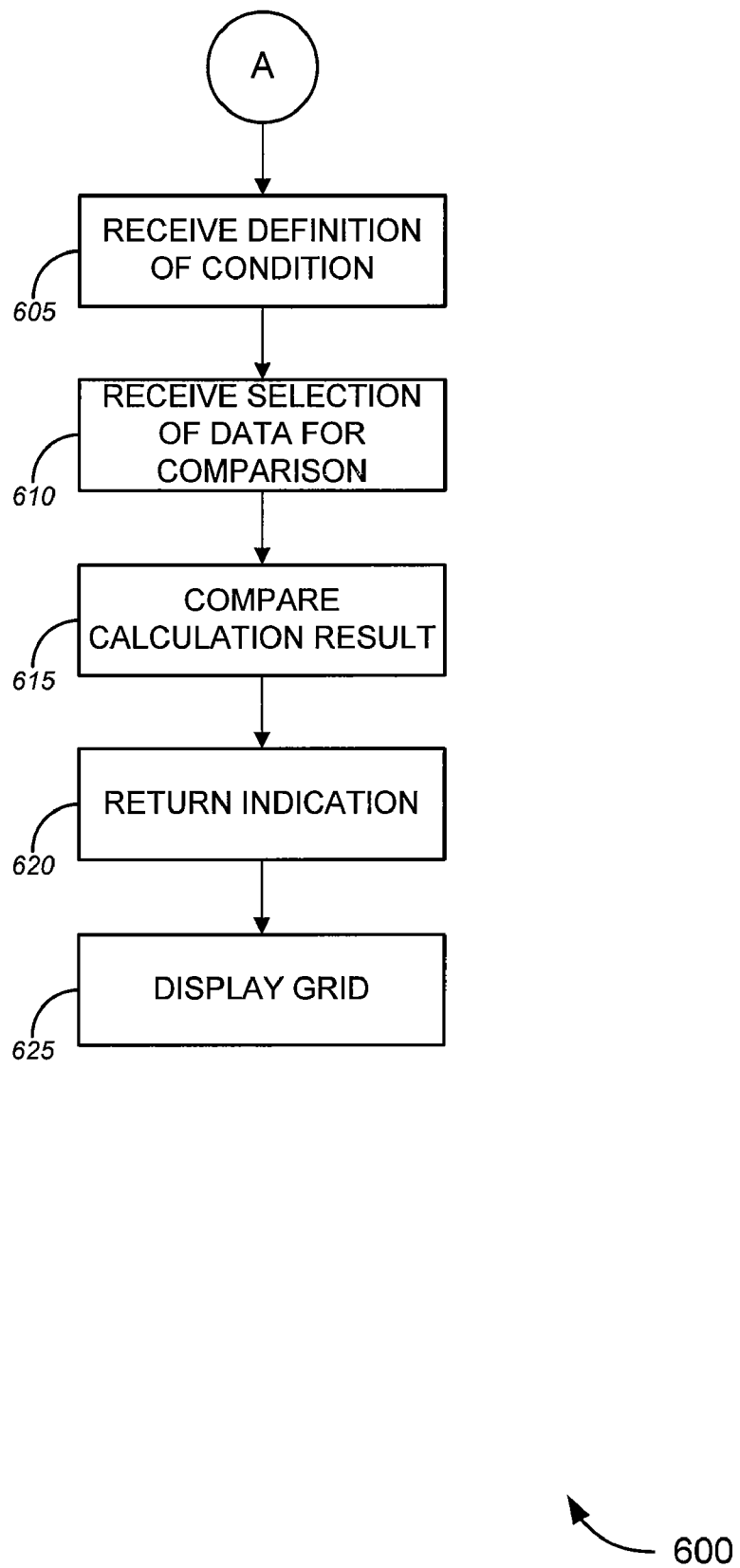
FIG. 6 is a process flow diagram illustrating a method using a named calculation as a threshold criteria, in accordance with various embodiments of the invention.

FIG. 6 illustrates a method 600 of comparing a set of results of a named calculation with a specified condition. The method 600 comprises receiving (e.g., from a user and/or via a user interface, which might be similar in some respects to those described above) input regarding a specified condition to which the results of a named calculation are to be compared (block 605). Merely by way of example, if a named calculation results in a numerical value, the specified condition might require that the numerical value, for each product lot analyzed, should be above (or below, or equal to) some threshold value. Other types of conditions are possible as well. For example, a condition might specify that a date must be earlier (or later) than some threshold date, that a value must contain (or be equal to) a specified string of text, and/or the like.

In a set of embodiments, the method comprises receiving (e.g., from a user) a selection of data for comparison to the condition (block 610). Merely by way of example, in some cases, the user might select one or more product lots for which the result of a named calculation is to be compared to the condition. In some cases, a data input field may be provided to allow the user to select the data. In other cases, the user might select the data in a display grid. Merely by way of example, the user might highlight one or more rows in a display grid. A button (or other user interface element) may be provided to confirm the selection and/or invoke the comparison.

The method further comprises a comparing a result of a named calculation with the defined condition (block 610) and returning an indication of the comparison (e.g., whether the results of the named calculation meets the defined condition) (block 615). In some embodiments, returning an indication might comprise triggering an alert if the result of the named calculation does not meet the condition. In a set of embodiments, returning the indication comprises displaying a display grid that comprises a column for displaying the indication (block 620). In other embodiments, returning the indication might comprise displaying a display grid comprising rows only for product lots that meet (or do not meet) the specified condition, of displaying a display grid that provides some other visual indication (such as shading, coloring, and/or font differences, to name a few examples) of rows that meet or do not meet the specified condition. In still other embodiments, returning the indication might comprise preparing a report comprising the indication, In a particular set of embodiments, a user interface for displaying a display grid might comprise a data input field allowing a user to specify a condition to which the result of a named calculation should be compared for each of the rows in a display grid, and/or a facility (which might be, but need not be, a data input field) for identifying the named calculation—which might, but need not necessarily—correspond to a configured column for comparison to the specified condition. Each row in the display grid might (but need not necessarily) correspond to a product lot, and the value in that column for each respective row might then be compared with the condition. In another set of embodiments, a column in a display grid might be populated with values displaying, for each respective row in the display grid, whether the product lot in that row meets the specified condition. Referring to the example above, if the condition is that each product lot should have "California" as the result of the named calculation identifying the largest region that comprises greater than 50% of the blend, the display grid might comprise a column indicating (e.g., whether, for each product lot displayed by the grid, the blend in fact has California the largest region.

Figure 7:
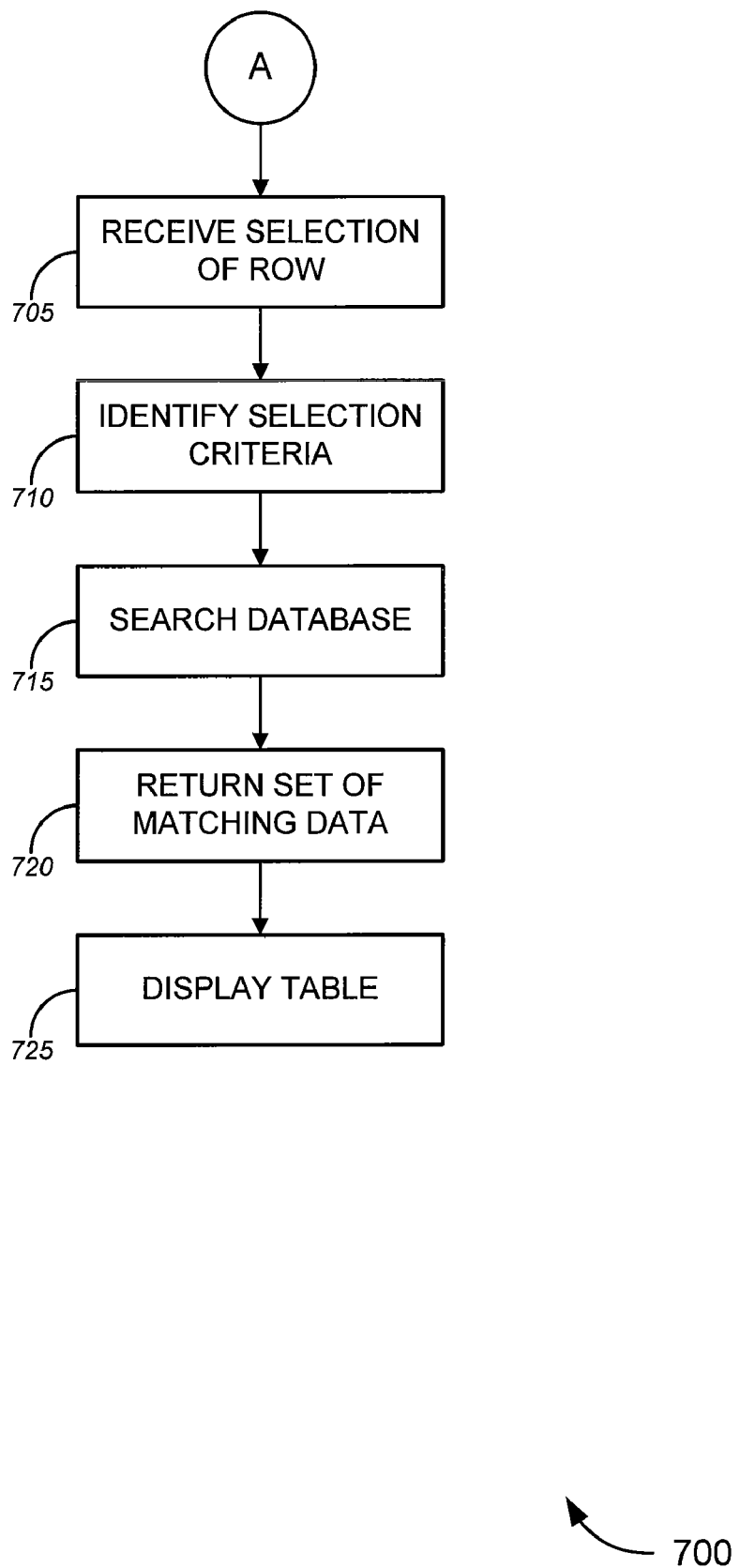
FIG. 7 is a process flow diagram illustrating a method using a named calculation as a selection criteria, in accordance with various embodiments of the invention.

Yet another application of named calculations and/or configured columns, in accordance with a set of embodiments, is the use of a display grid to allow a user to specify selection criteria for searching the database. FIG. 7 illustrates a method 700 of using a display grid to specify selection criteria. The method 700 (like the method 600 of FIG. 6), aspect, can be used in conjunction with some or all of the procedures (e.g., procedures for generating and/or displaying a display grid) described with respect to FIGS. 3-5 above.

The method 700 comprises receiving a selection of a row in the display grid (block 705). In some cases, each row in the display grid might be presented as hypertext (and/or as some other type of selectable text), and receiving a selection of a row in the display grid might comprise the user selecting (e.g., clicking on) the desired row. In other cases, each row might have some sort of selection facility, such as a checkbox, button and/or the like for selecting the desired row. Based on the selected row, a selection criteria is identified (block 710). Merely by way of example, a value in a configured column in the selected row might be identified as a selection criteria. (In some cases, the user may be the given the option to select the configured column for which the value is to be the selection criteria, e.g., via selectable text and/or some other selection facility, as described above.) In one embodiment, the user might simply need to select the cell that contains the value (which might be a result of a named calculation) that should be used as the selection criteria.

The method 700 further comprises searching the database, using the identified selection criteria (block 715). Based on the search, a set of matching data is returned (block 720). In some embodiments, returning the set of matching data may comprise displaying the matching data in a display table (which may be a display grid) (block 725). Merely by way of example, data matching the selection criteria may comprise data relating to one or more product lots, and the display grid might comprise a row corresponding to each of the one or more product lots. In particular embodiment, the display grid may have a display grid format specified according to the method 500 of FIG. 5, described above. In other embodiments, the display grid need not be used to return the set of matching data. For instance, a report comprising the set of matching data may be produced.

Similarly, a named calculation can be used as a selection criteria for a "query by example" function in a business application. Merely by way of example, the result of a named calculation can be used as the query example by which a database (e.g., a database maintained by a business application employing the display tools of the invention) can be searched.

Figure 8:
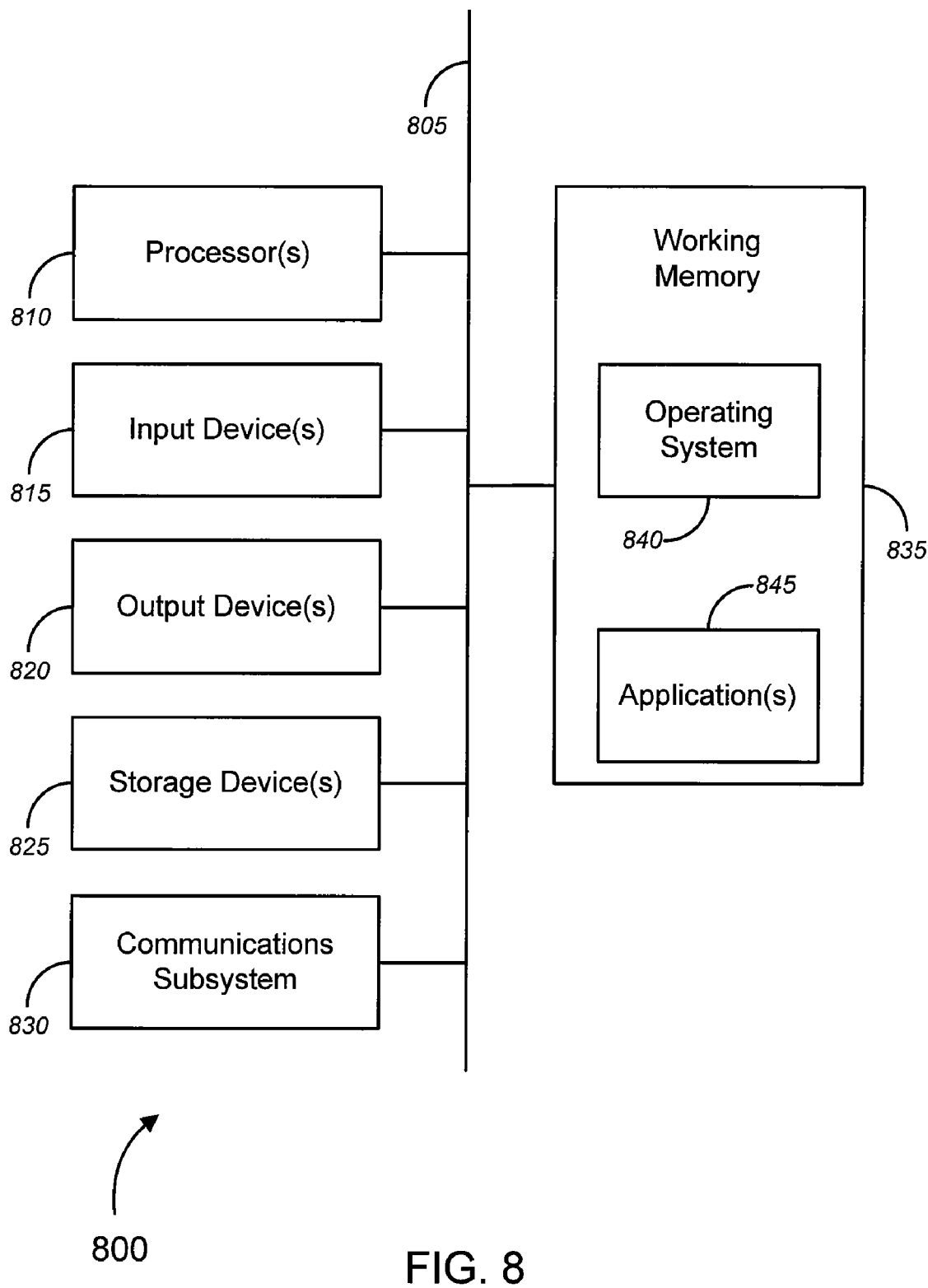
FIG. 8 is a generalized schematic diagram illustrating a computer system, in accordance with various embodiments of the invention.

FIG. 8 provides a schematic illustration of one embodiment of a computer system 800 that can perform the methods of the invention, as described herein, and/or can function as a server computer, a user computer, and/or the like. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

The computer system 800 is shown comprising hardware elements that can electrically coupled via a bus 805 (or may otherwise be in communication, as appropriate). The hardware elements can include one or more processors 810, including without limitation one or more general-purpose processors and/or one or more special-purpose processors (such as digital signal processing chips, graphics acceleration chips, and/or the like); one or more input devices 815, which can include without limitation a mouse, a keyboard and/or the like; and one or more output devices 820, which can include without limitation a display device, a printer and/or the like.

The computer system 800 may further include (and/or be in communication with) one or more storage devices 825, which can comprise, without limitation, local and/or network accessible storage and/or can include, without limitation, a disk drive, a drive array, an optical storage device, solid-state storage device such as a random access memory ("RAM") and/or a read-only memory ("ROM"), which can be programmable, flash-updateable and/or the like. The computer system 800 might also include a communications subsystem 830; which can include without limitation a modem, a network card (wireless or wired), an infra-red communication device, and/or the like), a wireless communication device and/or chipset (such as a Bluetooth™ device, an 802.11 device, a WiFi device, a WiMax device, cellular communication facilities, etc.). The communications system 830 may permit data to be exchanged with a network (such as the network 610 described below, and/or any other devices described herein. In many embodiments, the computer system 800 will further comprise a working memory 835, which can include a RAM or ROM device, as described above.

The computer system 800 also can comprise software elements, shown as being currently located within the working memory 835, including an operating system 840 and/or other code, such as one or more application programs 845, which may comprise computer programs of the invention and/or may be designed to implement methods of the invention, as described herein. Merely by way of example, one or more procedures described with respect to the method(s) discussed above might be implemented as instructions executable by a computer (and/or a processor within a computer). A set of these instructions might be stored on a computer-readable storage medium, such as the storage device(s) 825 described above. In some cases, the storage medium might be incorporated within a computer system, such as the system 800. In other embodiments, the storage medium might be separate from a computer system (i.e., a removable medium, such as a compact disc, etc.), such that the storage medium can be used to program a generic computer with the instructions stored thereon. These instructions might take the form of executable code, which is executable by the computer system 800 and/or might take the form of installable code, which, upon installation on the computer system 800 (e.g., using any of a variety of generally available installation programs, compression/decompression utilities, etc.) then takes the form of executable code.

It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

In one aspect, the invention employs a computer system (such as the computer system 800) to perform methods of the invention. According to a set of embodiments embodiment, some or all of the procedures of such methods are performed by the computer system 800 in response to processor 810 executing one or more sequences of one or more instructions (which might be incorporated into the operating system 840 and/or other code, such as an application program 845) contained in the working memory 835. Such instructions may be read into the working memory 835 from another machine-readable medium, such as one or more of the storage device(s) 825. Merely by way of example, execution of the sequences of instructions contained in the working memory 835 causes the processor(s) 810 to perform one or more procedures of the methods described herein.

The term "machine-readable medium" as used herein refers to any medium that participates in providing data that causes a machine to operation in a specific fashion. In an embodiment implemented using the computer system 800, various machine-readable media might be involved in providing instructions to processor(s) 810 for execution. In many implementations, a machine-readable medium is a physical and/or tangible medium. Such a medium may take many forms, including but not limited to, non-volatile media, volatile media, and transmission media. Non-volatile media includes, for example, optical or magnetic disks, such as the storage device(s) 825. Volatile media includes, without limitation dynamic memory, such as the working memory 835. Transmission media includes coaxial cables, copper wire and fiber optics, including the wires that comprise the bus 805, as well as the various components of the communication subsystem 830 (and/or the media by which the communications subsystem 830 provides communication with other devices). Hence, transmission media can also take the form of waves, including without limitation radio, acoustic and/or light waves, such as those generated during radio-wave and infrared data communications.

Common forms of physical and/or tangible machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to the processor(s) 810 for execution. Merely by way of example, the instructions may initially be carried on a magnetic disk and/or optical disc of a remote computer. The remote computer might load the instructions into its dynamic memory and send the instructions as signals over a transmission medium. These signals, which might be in the form of electromagnetic signals, acoustic signals, optical signals and/or the like, are all examples of carrier waves on which instructions can be encoded, in accordance with various embodiments of the invention.

The communications subsystem 830 (and/or components thereof) generally will receive the signals, and the bus 805 then might carry the signals (and/or the data, instructions, etc. carried by the signals) to the working memory 835, from which the processor(s) 805 retrieves and executes the instructions. The instructions received by the working memory 835 may optionally be stored on a storage device 825 either before or after execution by the processor(s) 810.

Figure 9:
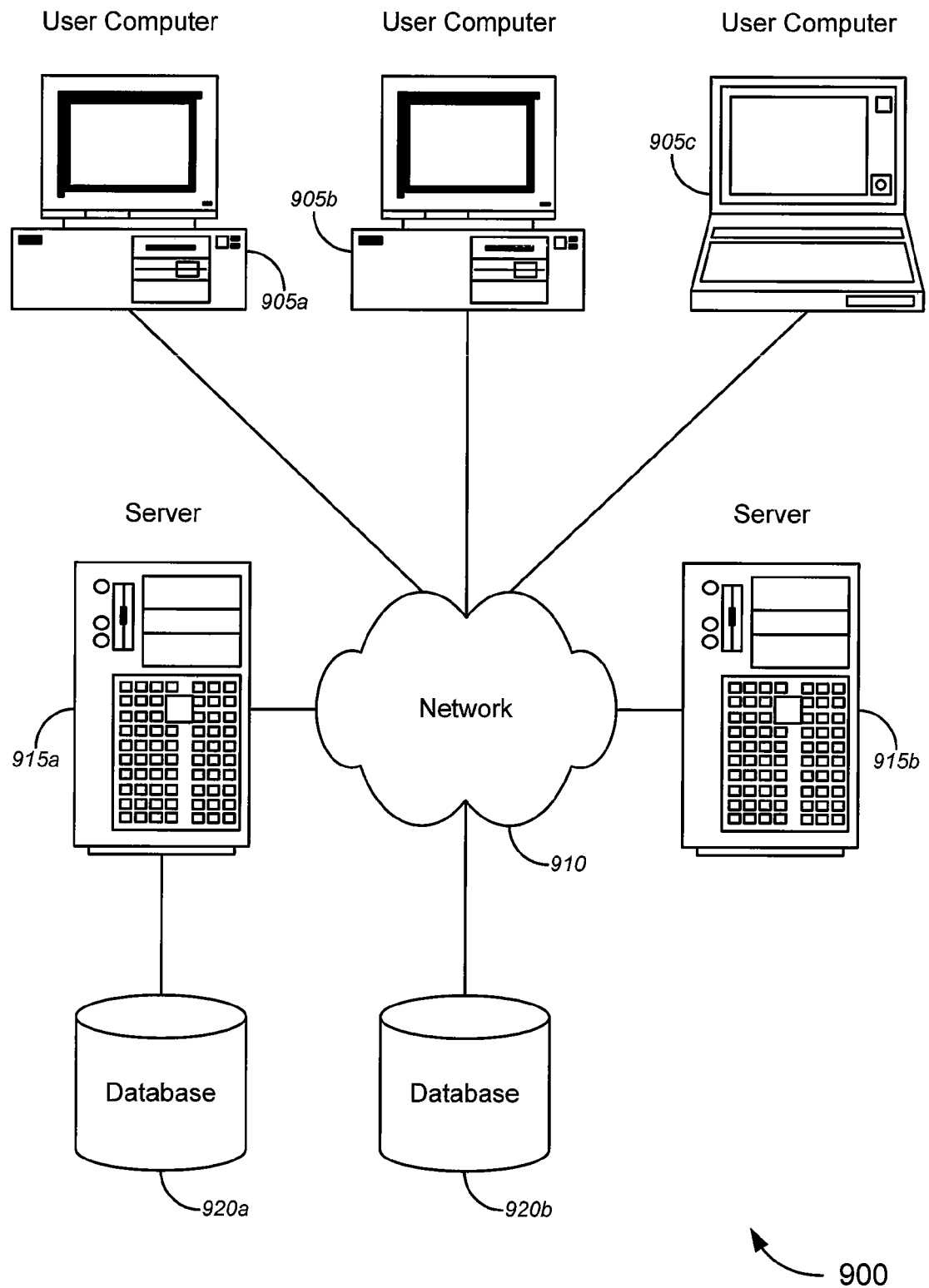
FIG. 9 is a generalized block diagram illustrating a networked system of computers, in accordance with various embodiments of the invention.

A set of embodiments comprises systems for defining named calculations and/or configured columns, as well as systems for displaying data. Merely by way of example, FIG. 9 illustrates a schematic diagram of a system 900 that can be used in accordance with one set of embodiments. The system 900 can include one or more user computers 905. The user computers 905 can be general purpose personal computers (including, merely by way of example, personal computers and/or laptop computers running any appropriate flavor of Microsoft Corp.'s Windows™ and/or Apple Corp.'s Macintosh™ operating systems) and/or workstation computers running any of a variety of commercially-available UNIX™ or UNIX-like operating systems. These user computers 905 can also have any of a variety of applications, including one or more applications configured to perform methods of the invention, as well as one or more office applications, database client and/or server applications, and web browser applications. Alternatively, the user computers 905 can be any other electronic device, such as a thin-client computer, Internet-enabled mobile telephone, and/or personal digital assistant, capable of communicating via a network (e.g., the network 910 described below) and/or displaying and navigating web pages or other types of electronic documents. Although the exemplary system 900 is shown with three user computers, any number of user computers can be supported.

Certain embodiments of the invention operate in a networked environment, which can include a network 910. The network 910 can be any type of network familiar to those skilled in the art that can support data communications using any of a variety of commercially-available protocols, including without limitation TCP/IP, SNA, IPX, AppleTalk, and the like. Merely by way of example, the network 910 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 915. Each of the server computers 915 may be configured with an operating system including without limitation any of those discussed above, as well as any commercially-available server operating systems. Each of the servers 915 may also be running one or more applications, which can be configured to provide services to one or more clients 905 and/or other servers 915.

Merely by way of example, one of the servers 915 may be a web server, which can be used, merely by way of example, to process requests for web pages or other electronic documents from user computers 905. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 905 to perform methods of the invention.

The server computers 915, in some embodiments, might include one ore more file and or/application servers, which can include one or more applications (such as business and/or enterprise applications) accessible by a client (including without limitation web browsers) running on one or more of the client computers 905 and/or other servers 915. Merely by way of example, the server(s) 915 can be one or more general purpose computers capable of executing programs or scripts in response to the user computers 905 and/or other servers 915, including without limitation web applications (which might, in some cases, be configured to perform methods of the invention). Merely by way of example, a web application can be implemented as one or more scripts or programs written in any programming language, such as Java™, C, C#™ or C++, and/or any scripting language, such as Perl, Python, or TCL, as well as combinations of any programming/scripting languages. The application server(s) can also include database servers, including without limitation those commercially available from Oracle, Microsoft, Sybase™, IBM™ and the like, which can process requests from database clients running on a user computer 905 and/or another server 915. In some embodiments, an application server can create web pages dynamically for displaying the information in accordance with embodiments of the invention, such as displaying user interfaces for receiving input data, user interfaces for displaying display grids, and/or the like. Data provided by an application server may be formatted as web pages (comprising HTML, Javascript, etc., for example) and/or may be forwarded to a user computer 905 via a web server (as described above, for example). Similarly, a web server might receive web page requests and/or input data from a user computer 905 and/or forward the web page requests and/or input data to an application server.

In accordance with further embodiments, one or more servers 915 can function as a file server and/or can include one or more of the files necessary to implement methods of the invention incorporated by an application running on a user computer 905 and/or another server 915. Alternatively, as those skilled in the art will appreciate, a file server can include all necessary files, allowing such an application to be invoked remotely by a user computer 905 and/or server 915. It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 920. The location of the database(s) 920 is discretionary: merely by way of example, a database 920a might reside on a storage medium local to (and/or resident in) a server 915a (and/or a user computer 905). Alternatively, a database 920b can be remote from any or all of the computers 905, 915, so long as it can be in communication (e.g., via the network 910) with one or more of these. In a particular set of embodiments, a database 920 can reside in a storage-area network ("SAN") familiar to those skilled in the art. (Likewise, any necessary files for performing the functions attributed to the computers 905, 915 can be stored locally on the respective computer and/or remotely, as appropriate.) In one set of embodiments, the database 935 can be a relational database, such as an Oracle database, that is adapted to store, update, and retrieve data in response to SQL-formatted commands. The database might be controlled and/or maintained by a database server, as described above, for example. As noted above, one or more of the database(s) 920 may store information generated and/or used by a business application. In some cases, the information may comprise a plurality of lot entities, and/or the business application may interact with the database to modify at least some of the lot entities.

While the invention has been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods of the invention are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with different embodiments of the invention.

Moreover, while the procedures comprised in the methods and processes described herein are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary features, the various components and/or features described herein with respect to a particular embodiment can be substituted, added and/or subtracted from among other described embodiments, unless the context dictates otherwise. Consequently, although the invention has been described with respect to exemplary embodiments, it will be appreciated that the invention is intended to cover all modifications and equivalents within the scope of the following claims.

What is claimed is:

1. A method of displaying data in an enterprise application for a user, the method comprising:
   accessing a database comprising information about a plurality of product lots, the information organized in a plurality of sets of lot entities, each set of lot entities comprising data about a particular product lot, each lot entity comprising a plurality of data fields
   generating a plurality of named calculations, each of the named calculations defining a configured column for use in a display grid and, wherein generating each of the plurality of named calculations comprises:
      receiving, from the user, a selection of a type of lot entity to which the named calculation should apply;
      receiving, from the user, a selection of a first field identifier corresponding to a field in each lot entity having the selected type of lot entity, the first field identifier identifying a first field that is evaluated by the named calculation;
      receiving, from the user, a selection of a rule that is applied to the first field, wherein the rules include comparison operators, threshold values, largest value, second largest value, and smallest value;
      receiving, from the user, a selection of a second field identifier corresponding to a second field that is selected by the named calculation, based on an evaluation of the first field by the selected rule; and
      receiving, from the user, a selection of a rule type for the named calculation, wherein the receiving a selection of a rule type comprises presenting to the user a list of rules, wherein the list of rules includes a selected single rule type which is used to find a specific field in a table and return a value of the specific field, a selected numeric rule type which is used to search a selected numeric field using a specified rule and return a string value for display in a configured column, a selected string rule type which is used to find a specific field in a table that includes a specific string value and return a numeric value, and a value rule type which provides a numerical value that is derived from a set of cells;
   receiving first input from a web browser regarding a first display grid format;
   defining the first display grid format, based at least in part on the first input, the first display grid format comprising a first ordering of a first set of columns, the first set of columns comprising a first configured column defined by a first named calculation from the plurality of named calculations;
   receiving second input from the web browser regarding a second display grid format;
   defining the second display grid format, based at least in part on the second input, the second display grid format comprising a second ordering of a second set of columns, the second set of columns comprising a second configured column defined by a second named calculation from the plurality of named calculations;
   receiving third input from the web browser regarding a display grid format path;
   defining the display grid format path, the display grid format path comprising a list of a plurality of display grid formats, the plurality of display grid formats comprising the first display grid format and the second display grid format, the format path further defining an order in which the plurality of display grid formats are to be listed;
   displaying, on the web browser for a user, the display grid format path;
   receiving, from the web browser, a selection of one of the plurality of display grid formats;
   displaying, on the web browser for the user, a first display grid having the selected display grid format;
   receiving, from the web browser, a selection of a first row of the display grid;
   searching the database for a set of data matching a first result of the first named calculation; and
   returning the set of data matching the first result of the first named calculation.

2. The method as recited by claim 1, wherein at least one input selected from the group consisting of the first input, second input and third input is received from the user.

3. The method as recited by claim 1, wherein the first set of columns and the second set of columns share one or more configured columns.

4. The method as recited by claim 1, further comprising:
   receiving, from the user a selection of a third field identifier corresponding to a third field in lot entity that contains a value to be returned in the configured column.

5. The method as recited by claim 1, further comprising:
   saving one or more of the named calculations in the database.

6. The method as recited by claim 1, further comprising:
   displaying a result of the first named calculation in a first column of the display grid, wherein the display grid comprises a plurality of rows, each row corresponding to one of the product lots, wherein the value in the first column for a particular row comprises a result of the named calculation for a product lot corresponding to the particular row.

7. The method as recited by claim 1, wherein the display grid comprises a plurality of rows, each row corresponding to a product lot.

8. The method as recited by claim 1, wherein the first named calculation defines a first configured column for the display grid, the first named calculation calculating, for each row in the display grid, a value being based on at least one data field in a lot entity corresponding to that row, and wherein the method further comprises:
   receiving, from a user, a specified condition to which a result of the first named calculation should be compared;
   comparing, for each of the plurality of values displayed in the first configured column, a result of the named calculation with the specified condition; and
   returning, with respect to at least one of the rows, an indication of whether the result of the named calculation meets the specified condition.

9. A system for displaying data in an enterprise application for a user, the system comprising:
   one or more processors;
   a database comprising information about a plurality of product lots, the information organized in a plurality of sets of lot entities, each set of lot entities comprising data about a particular product lot, each lot entity comprising a plurality of data fields; and
   a non-transitory machine readable medium having stored thereon a set of instructions executable by the one or more processors, the set of instructions comprising:
      instructions for accessing the database comprising information about a plurality of product lots, the information organized in a plurality of sets of lot entities, each set of lot entities comprising data about a particular product lot, each lot entity comprising a plurality of data fields instructions for generating a plurality of named calculations, each of the named calculations defining a configured column for use in a display grid, wherein the display grid comprises a plurality of rows, each row corresponding to a product lot and, wherein generating each of the plurality of named calculations comprises:

instructions for receiving, from the user, a selection of a type of lot entity to which the named calculation should apply;

instructions for receiving, from the user, a selection of a first field identifier corresponding to a field in each lot entity having the selected type of lot entity, the first field identifier identifying a first field that is evaluated by the named calculation;

instructions for receiving, from the user, a selection of a rule that is applied to the first field, wherein the rules include comparison operators, threshold values, largest value, second largest value, and smallest value;

instructions for receiving, from the user, a selection of a second field identifier corresponding to a second field that is selected by the named calculation, based on an evaluation of the first field by the selected rule; and instructions for receiving, from the user, a selection of a rule type for the named calculation, wherein the receiving a selection of a rule type comprises presenting to the user a list of rules, wherein the list of rules includes a selected single rule type which is used to find a specific field in a table and return a value of the specific field, a selected numeric rule type which is used to search a selected numeric field using a specified rule and return a string value for display in a configured column, a selected string rule type which is used to find a specific field in a table that includes a specific string value and return a numeric value, and a value rule type which provides a numerical value that is derived from a set of cells;

instructions for receiving first input from a web browser regarding a first display grid format;

instructions for defining the first display grid format, based at least in part on the first input, the first display grid format comprising a first ordering of a first set of columns, the first set of columns comprising a first configured column defined by a first named calculation from the plurality of named calculations;

instructions for receiving second input from the web browser regarding a second display grid format;

instructions for defining the second display grid format, based at least in part on the second input, the second display grid format comprising a second ordering of a second set of columns, the second set of columns comprising a second configured column defined by a second named calculation from the plurality of named calculations;

instructions for receiving third input from the web browser regarding a display grid format path;

instructions for defining the display grid format path, the display grid format path comprising a list of a plurality of display grid formats, the plurality of display grid formats comprising the first display grid format and the second display grid format, the format path further defining an order in which the plurality of display grid formats are to be listed;

instructions for displaying, on the web browser for a user, the display grid format path;

instructions for receiving, from the web browser, a selection of one of the plurality of display grid formats;

instructions for displaying, on the web browser for the user, a first display grid having the selected display grid format;

instructions for receiving, from the web browser, a selection of a first row of the display grid;

instructions for searching the database for a set of data matching a first result of the first named calculation; and instructions for returning the set of data matching the first result of the first named calculation.

10. The system as recited by claim 9, further comprising a web server, wherein receiving input from a user comprises receiving input at the web server from the web browser on a user computer operated by the user and wherein instructions for returning an indication comprise instructions for transmitting the indication via the web server for display by the web browser.

11. A non-transitory machine readable medium having embodied thereon a computer program comprising a set of instructions executable by one or more processors, the set of instructions comprising:

instructions for accessing a database comprising information about a plurality of product lots, the information organized in a plurality of sets of lot entities, each set of lot entities comprising data about a particular product lot, each lot entity comprising a plurality of data fields instructions for generating a plurality of named calculations, each of the named calculations defining a configured column for use in a display grid and, wherein generating each of the plurality of named calculations comprises:

receiving, from the user, a selection of a type of lot entity to which the named calculation should apply;

receiving, from the user, a selection of a first field identifier corresponding to a field in each lot entity having the selected type of lot entity, the first field identifier identifying a first field that is evaluated by the named calculation;

receiving, from the user, a selection of a rule that is applied to the first field, wherein the rules include comparison operators, threshold values, largest value, second largest value, and smallest value;

receiving, from the user, a selection of a second field identifier corresponding to a second field that is selected by the named calculation, based on an evaluation of the first field by the selected rule; and receiving, from the user, a selection of a rule type for the named calculation, wherein the receiving a selection of a rule type comprises presenting to the user a list of rules, wherein the list of rules includes a selected single rule type which is used to find a specific field in a table and return a value of the specific field, a selected numeric rule type which is used to search a selected numeric field using a specified rule and return a string value for display in a configured column, a selected string rule type which is used to find a specific field in a table that includes a specific string value and return a numeric value, and a value rule type which provides a numerical value that is derived from a set of cells;

instructions for receiving first input from a web browser regarding a first display grid format;

instructions for defining the first display grid format, based at least in part on the first input, the first display grid format comprising a first ordering of a first set of columns, the first set of columns comprising a first configured column defined by a first named calculation from the plurality of named calculations;

instructions for receiving second input from the web browser regarding a second display grid format;

instructions for defining the second display grid format, based at least in part on the second input, the second display grid format comprising a second ordering of a second set of columns, the second set of columns comprising a second configured column defined by a second named calculation from the plurality of named calculations;

instructions for receiving third input from the web browser regarding a display grid format path;

instructions for defining the display grid format path, the display grid format path comprising a list of a plurality of display grid formats, the plurality of display grid formats comprising the first display grid format and the second display grid format, the format path further defining an order in which the plurality of display grid formats are to be listed;

instructions for displaying, on the web browser for a user, the display grid format path;

instructions for receiving, from the web browser, a selection of one of the plurality of display grid formats;

instructions for displaying, on the web browser for the user, a first display grid having the selected display grid format;

instructions for receiving, from the web browser, a selection of a first row of the display grid;

instructions for searching the database for a set of data matching a first result of the first named calculation; and instructions for returning the set of data matching the first result of the first named calculation.

* * * * *

UNITED STATES PATENT AND TRADEMARK OFFICE
CERTIFICATE OF CORRECTION

PATENT NO. : 8,316,318 B2  
APPLICATION NO. : 11/750454  
DATED : November 20, 2012  
INVENTOR(S) : Shortell et al.

Page 1 of 1

It is certified that error appears in the above-identified patent and that said Letters Patent is hereby corrected as shown below:

In column 9, line 63, delete "below)" and insert -- below). --, therefor.

In column 11, line 26, delete "and or" and insert -- and/or --, therefor.

In column 11, line 43, delete "FIG. 1" and insert -- FIG. 1. --, therefor.

In column 14, line 56, delete "320)" and insert -- 320). --, therefor.

In column 17, line 32, delete "indication," and insert -- indication. --, therefor.

Signed and Sealed this  
Twelfth Day of February, 2013

Teresa Stanek Rea  
*Acting Director of the United States Patent and Trademark Office*